US012767565B2

(12) United States Patent
Park et al.

(10) Patent No.: US 12,767,565 B2
(45) Date of Patent: Oct. 20, 2026

(54) ION FILTER

(71) Applicants: HYUNDAI MOTOR COMPANY, Seoul (KR); KIA CORPORATION, Seoul (KR); KORENS CO., LTD., Yangsan-si (KR)

(72) Inventors: Hun Woo Park, Namyangju-si (KR); Hyun Ju Ji, Seoul (KR); Sun Ae Park, Seongnam-si (KR); Hyung Geun Cho, Busan (KR)

(73) Assignees: HYUNDAI MOTOR COMPANY, Seoul (KR); KIA CORPORATION, Seoul (KR); KORENS CO., LTD., Yangsan-si (KR)

( * ) Notice: Subject to any disclaimer, the term of this patent is extended or adjusted under 35 U.S.C. 154(b) by 771 days.

(21) Appl. No.: 17/983,764

(22) Filed: Nov. 9, 2022

(65) Prior Publication Data

US 2023/0174393 A1 Jun. 8, 2023

(30) Foreign Application Priority Data

Dec. 3, 2021 (KR) ........................ 10-2021-0172224

(51) Int. Cl.
*C02F 1/42* (2023.01)
*B01D 15/10* (2006.01)
(Continued)

(52) U.S. Cl.
CPC ................ *C02F 1/42* (2013.01); *B01D 15/10* (2013.01); *B01D 15/361* (2013.01); (Continued)

(58) Field of Classification Search
CPC .................. C02F 1/42; C02F 2103/023; C02F 2201/004; C02F 2201/005; B01D 15/10; B01D 15/361; B01D 29/31; B01D 29/96; B01D 35/02; H01M 8/04044; H01M 2250/20; H01M 8/04029; B01J 47/024
See application file for complete search history.

(56) References Cited

U.S. PATENT DOCUMENTS 3,890,232 A * 6/1975 Combest ................ B01D 35/06 210/223
4,379,053 A * 4/1983 Brane .................. B01D 35/147 210/419
(Continued)

FOREIGN PATENT DOCUMENTS

JP 3954170 B2 8/2007
JP 5532197 B2 6/2014
(Continued)

*Primary Examiner* — Jennifer Dieterle
(74) *Attorney, Agent, or Firm* — MCDONNELL BOEHNEN HULBERT & BERGHOFF LLP

(57) ABSTRACT

An ion filter installed in a cooling water circulation line of a fuel cell system of a vehicle includes a filter housing disposed on a flow path through which a fluid flows, a filtering element accommodated in the filter housing and configured to filter the fluid introduced into the filter housing, and an inlet communication element provided on an inlet portion of the filter housing and configured to selectively block a flow of fluid introduced into the filter housing from the flow path when the filter housing detached from the flow path.

15 Claims, 11 Drawing Sheets

(51) Int. Cl.
*B01D 15/36* (2006.01)
*H01M 8/04044* (2016.01)
*C02F 103/02* (2006.01)

(52) U.S. Cl.
CPC ... *H01M 8/04044* (2013.01); *C02F 2103/023* (2013.01); *C02F 2201/004* (2013.01); *C02F 2201/005* (2013.01); *H01M 2250/20* (2013.01)

(56) References Cited

U.S. PATENT DOCUMENTS

| | | | | | |
|---|---|---|---|---|---|
| 4,731,183 | A * | 3/1988 | Schumacher, II | B01D 35/153 | 210/419 |
| 7,000,894 | B2 * | 2/2006 | Olson | B01D 35/147 | 137/594 |
| 7,947,171 | B2 | 5/2011 | Takemoto | | |
| 2001/0045386 | A1 * | 11/2001 | Stankowski | B01D 29/606 | 210/235 |
| 2010/0089472 | A1 * | 4/2010 | Meza | E03C 1/04 | 210/136 |
| 2013/0220996 | A1 * | 8/2013 | Liney | H05B 6/108 | 29/602.1 |
| 2015/0014252 | A1 * | 1/2015 | Justus, Sr. | C02F 1/002 | 210/416.3 |
| 2015/0017560 | A1 * | 1/2015 | Mittmann | H01M 8/04067 | 429/535 |
| 2016/0131273 | A1 * | 5/2016 | Onishi | F17C 13/04 | 220/86.1 |
| 2016/0169180 | A1 * | 6/2016 | McAlister | F02M 61/08 | 239/584 |
| 2017/0058729 | A1 * | 3/2017 | Lochrane | G05D 23/02 | |
| 2017/0191567 | A1 * | 7/2017 | Na | F16K 17/30 | |
| 2018/0229163 | A1 * | 8/2018 | Zhibin | B01D 29/56 | |
| 2022/0331719 | A1 * | 10/2022 | Stehle | B01D 29/96 | |
| 2022/0355228 | A1 * | 11/2022 | You | F25D 23/028 | |

FOREIGN PATENT DOCUMENTS

| | | | |
|---|---|---|---|
| JP | 6437259 | B2 | 12/2018 |
| JP | 6579001 | B2 | 9/2019 |
| KR | 101745000 | B1 | 6/2017 |
| KR | 2020-0070718 | A | 6/2020 |

* cited by examiner

FIG. 1("Prior Art")

ION FILTER

CROSS REFERENCE TO RELATED APPLICATIONS

This application claims under 35 U.S.C. § 119(a) the benefit of priority to Korean Patent Application No. 10-2021-0172224 filed on Dec. 3, 2021, the entire contents of which are incorporated herein by reference.

BACKGROUND

(a) Technical Field

The present disclosure relates to an ion filter and, more particularly, to an ion filter installed in a cooling water circulation line of a fuel cell system of a vehicle.

(b) Background Art

A fuel cell system generates electric energy through an electrochemical reaction of a reaction gas in a fuel cell stack. The fuel cell stack is connected to an air supply device configured to supply air containing oxygen required for an electrochemical reaction and a hydrogen supply device configured to supply hydrogen as fuel. In addition, the fuel cell system includes heat and water management systems for discharging heat and water byproducts as a result of the electrochemical reaction in the fuel cell stack to the outside.

As described above, the fuel cell stack generates electric energy from the electrochemical reaction between hydrogen and oxygen, which are reaction gases, and discharges heat and water as byproducts of the reaction. Accordingly, in order to prevent a temperature of the stack from increasing, the fuel cell system includes a cooling device for cooling the stack and employs a water cooling method of cooling the stack by circulating cooling water through a cooling water channel in the stack.

A fuel-cell ion filter is provided in a circulation line of the cooling water which circulates in the stack and comes out of the stack. The fuel-cell ion filter maintains electrical conductivity, which increases due to positive ions and negative ions present in the cooling water, below a certain level, thereby improving electrical insulation stability of the vehicle.

An ion filter cartridge filled with an ion exchange resin is installed in an ion filter housing, and the ion filter cartridge needs to be replaced at a regular period due to a filtering lifetime of the ion exchange resin. An upper line of the ion filter housing should be located on an uppermost end of a thermal management system (TMS) to minimize leakage of the cooling water during the regular maintenance.

As shown in FIG. 1, an upper portion of an ion filter housing 610 is disposed to align with an uppermost line of the TMS, which is approximately indicated as a line A1. To this end, a length of a mounting bracket 630 is significantly increased, and thus the ion filter housing 610 is located at the same level as the line A1.

If the upper portion of the ion filter housing 610 is disposed on a line A2, which means when the upper portion of the ion filter housing 610 is disposed at a lower position than the line A1, the upper portion of the ion filter housing 610 is lower than the uppermost end of the cooling water line. In this case, there is a problem in that loss of cooling water is excessive after the ion filter cartridge is replaced.

When the upper portion of the ion filter housing 610 is approximately aligned with the line A3, the upper portion of the ion filter housing 610 becomes higher than the uppermost end of the cooling water line. In this case, air bubbles are collected in the ion filter, which reduces a flow of the cooling water.

As described above, there is a constraint on an arrangement of the ion filter to correspond to the uppermost end of the TMS. Lengthening the mounting bracket 630 increases an overall weight and cost of the vehicle.

SUMMARY

The present disclosure has been made in an effort to solve the above-described problems associated with prior art.

In one aspect, the present disclosure provides an ion filter capable of overcoming a water head limitation of the conventional ion filter and improving a degree of freedom in design of a thermal management system (TMS) of a fuel cell.

In another aspect, the present disclosure provides an ion filter which is easy to maintain.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof A feature of the present disclosure for achieving the above described objectives of the present disclosure and performing characteristic functions thereof, which will be described below, is as follows.

In an exemplary embodiment, the present disclosure provides an ion filter including a filter housing disposed on a flow path through which a fluid flows, a filtering element accommodated in the filter housing and configured to filter the fluid introduced into the filter housing, and an inlet communication element provided on an inlet portion of the filter housing and configured to selectively block a flow of fluid introduced into the filter housing from the flow path.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 10 shows a valve plate when opened, and FIG. 11 shows the valve plate when closed.

Figure 1:
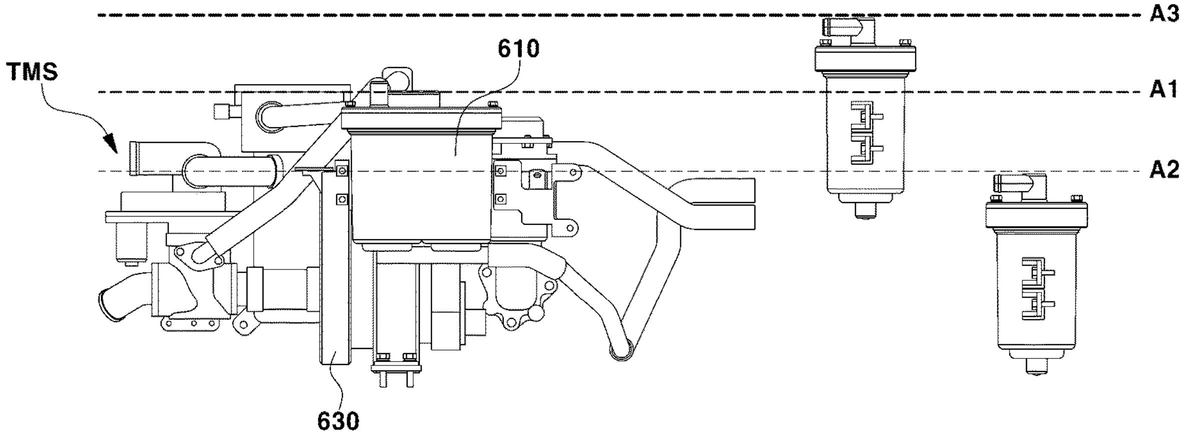
FIG. 1 is a diagram illustrating an ion filter in a fuel cell system.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Specific structures or functional descriptions presented in the embodiments of the present disclosure are merely exemplified for the purpose of describing the embodiments according to the concept of the present disclosure, and the embodiments according to the concept of the present disclosure may be implemented in various forms. In addition, the embodiments are not to be taken in a sense which limits the present disclosure to the specific embodiments, and should be construed to include modifications, equivalents, or substitutes within the spirit and technical scope of the present disclosure.

Meanwhile, the terms first, second, and/or the like in the present disclosure may be used to describe various components, but the components are not limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected" or "coupled" to another component, it may be directly connected or coupled to another component, but it should be understood that still another component may be present between the component and another component. On the contrary, when a component is referred to as being "directly connected to," or "directly in contact with" another component, it should be understood that still another component may not be present between the component and another component. Other expressions describing the relationship between components, that is, "between" and "immediately between," or "adjacent to" and "directly adjacent to" should also be construed as described above.

Throughout the present specification, the same reference numerals indicate the same components. Meanwhile, terms used herein are for the purpose of describing the embodiments and are not intended to limit the present disclosure. As used herein, the singular forms include the plural forms as well unless the context clearly indicates otherwise. It is noted that the terms "comprises" and/or "comprising" used herein does not exclude the presence or addition of one or more other components, steps, operations, and/or elements in addition to stated components, steps, operations, and/or elements.

Due to a limited mounting position of an ion filter in a fuel cell system, there is limitation in the design of the fuel cell system. According to the present disclosure, a water head limitation of the ion filter may be overcome to improve the degree of freedom in design so that maintenance of a cartridge filter of the ion filter may be easier.

The ion filter according to the present disclosure includes an inlet communication element and an outlet communication element which are capable of blocking a flow of cooling water between the inside and outside of the ion filter when the cartridge filter is replaced. Consequently, when the cartridge filter is replaced, it is possible to minimize loss of the cooling water and increase the degree of freedom in design without water head limitation.

Hereinafter, exemplary embodiments of the present disclosure will be described in detail with reference to the accompanying drawings.

Figure 2:
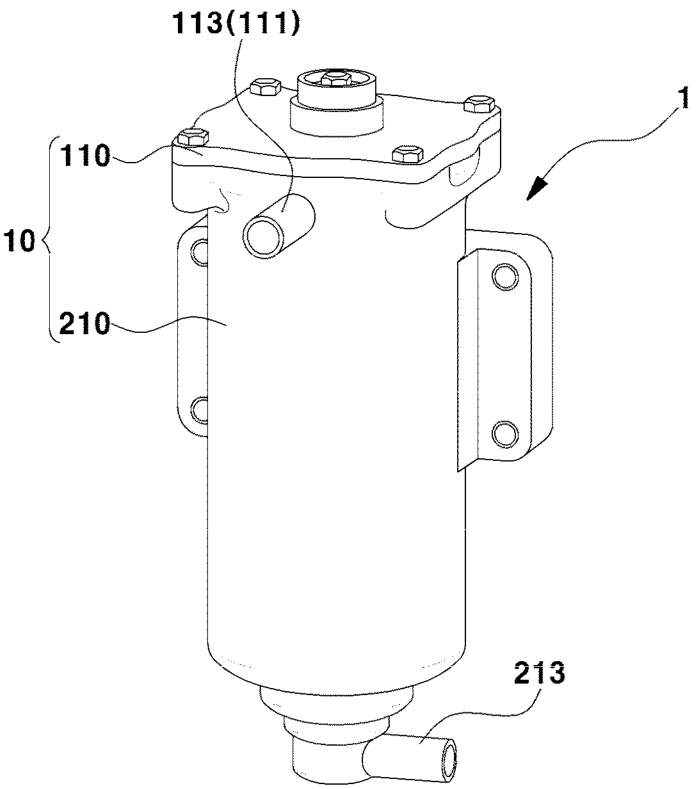
FIG. 2 is a perspective view illustrating the ion filter according to an embodiment of the present disclosure.
Figure 3:
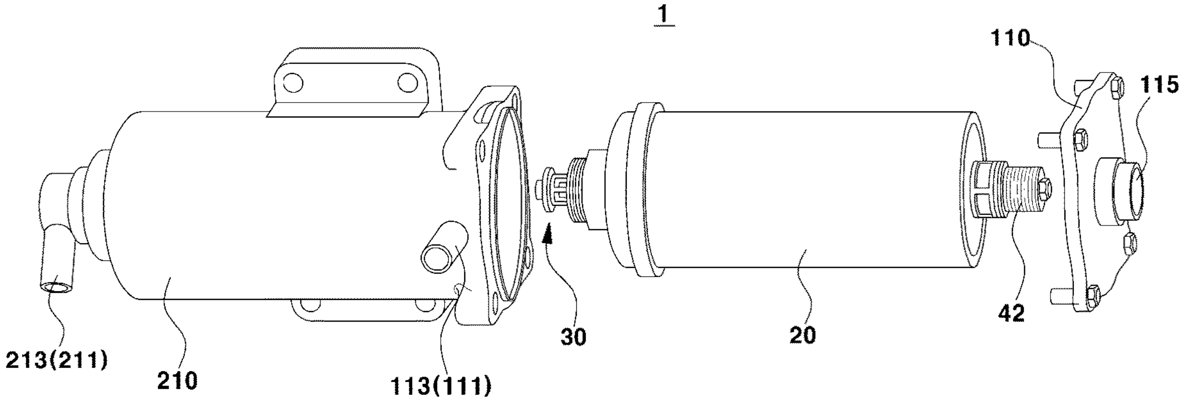
FIG. 3 is an exploded perspective view of FIG. 2.

As shown in FIGS. 2 and 3, according to the present disclosure, an ion filter 1 includes a filter housing 10, a filtering element 20, and an inlet communication element.

The filter housing 10 includes a lid 110 and an accommodation part 210. The accommodation part 210 accommodates the filtering element 20. The lid 110 is coupled to the accommodation part 210 to be detachable from the accommodation part 210. In addition, the lid 110 is watertightly coupled to the accommodation part 210 to prevent cooling water from leaking from the accommodation part 210.

The filter housing 10 includes an inlet portion through which the cooling water is introduced from the outside and an outlet portion through which the cooling water passing through the filter housing 10 is discharged to the outside. In particular, the accommodation part 210 includes an inlet 211 through which the cooling water flowing into the filter housing 10 is introduced. The inlet 211 may include a tubular part 213 or may be connected thereto. The tubular part 213 is connected to an external hose or a pipe which supplies the cooling water to the ion filter 1.

In addition, according to one embodiment of the present disclosure, the accommodation part 210 includes an outlet 111 through which the cooling water passing through the accommodation part 210 is discharged. The outlet 111 may include a tubular part 113 or may be connected thereto. The tubular part 113 is connected to an external hose or a pipe which is connected to allow the cooling water passing through the ion filter 1 to flow to the outside. According to another embodiment of the present disclosure, the outlet 111 may be provided at the lid 110. That is, the outlet 111 may be provided on the lid 110 instead of being provided in the accommodation part 210.

The filtering element 20 is accommodated in the filter housing 10, particularly in the accommodation part 210. The filtering element 20 removes positive ions and negative ions present in the cooling water. According to an embodiment of the present disclosure, the filtering element 20 is a cartridge filter.

Meanwhile, an extra empty space is provided after the filtering element 20 is accommodated in the filter housing 10 or the accommodation part 210. As described in detail below, the extra space is provided in the accommodation part 210 to allow the filtering element 20 to move in the accommodation part 210 by operations of a ball joint 40 and a socket joint 42.

When the filtering element 20 is replaced, the inlet communication element prevents the cooling water from leaking through the inlet portion of the ion filter 1. The inlet communication element is configured to block the flow of the cooling water introduced into the ion filter 1 from the inlet portion of the ion filter 1.

According to some embodiments of the present disclosure, an outlet communication element is further included. When the filtering element 20 is replaced, the outlet communication element prevents the cooling water from leaking through the outlet portion of the ion filter 1. The outlet communication element is disposed on the outlet portion of the ion filter 1 and configured to block the flow of the cooling water from an inside of the ion filter 1 to the outside.

Hereinafter, the inlet communication element and the outlet communication element according to various embodiments of the present disclosure will be described.

Figure 4:
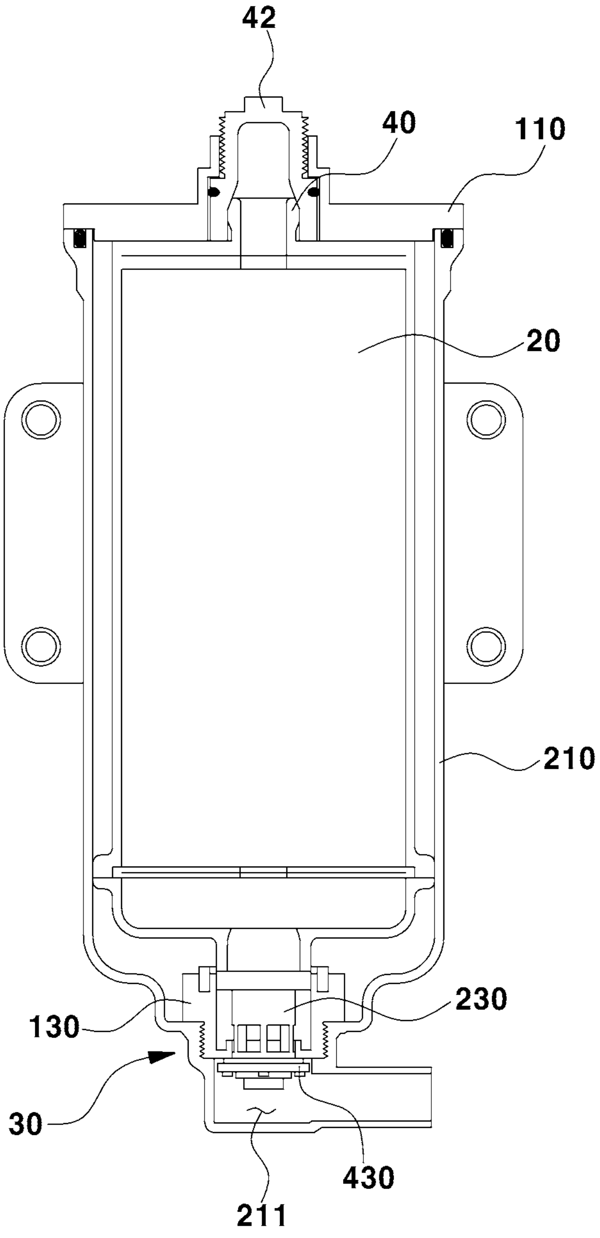
FIG. 4 is a cross-sectional view of FIG. 3.
Figure 5:
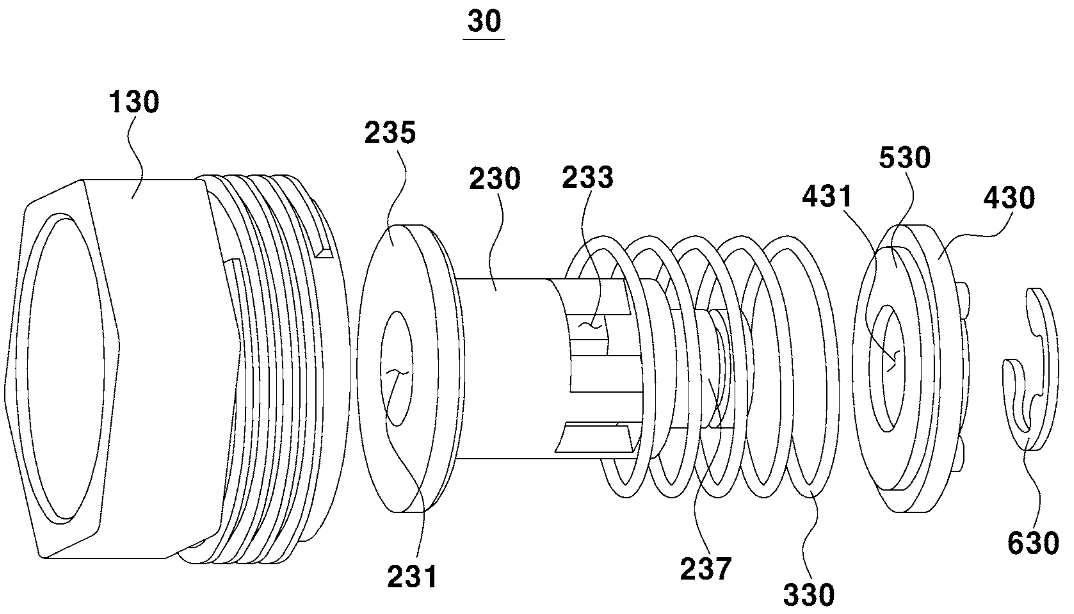
FIG. 5 is an exploded perspective view illustrating a valve assembly of FIG. 4.
Figure 6:
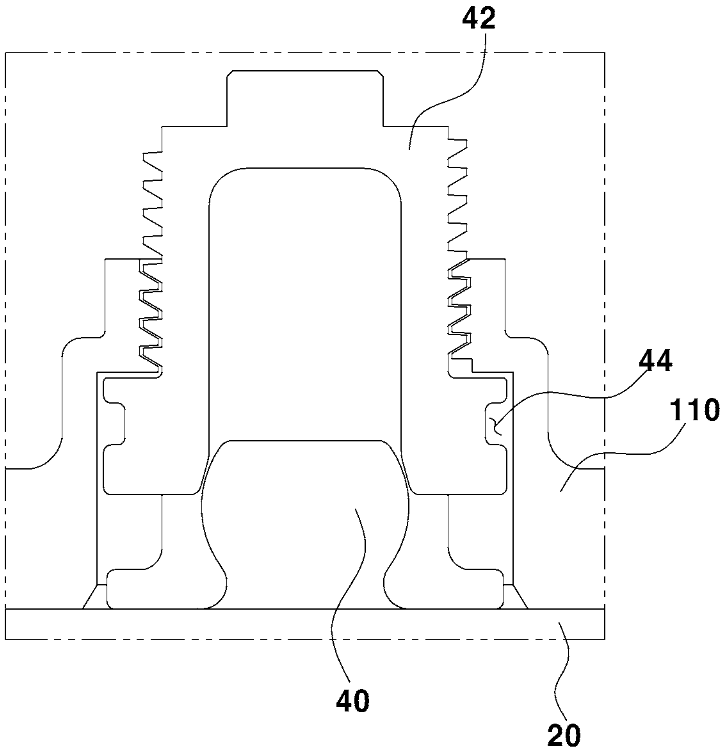
FIG. 6 is an enlarged view illustrating a ball joint and a socket joint of FIG. 4.

Referring to FIGS. 4 to 6, according to some embodiments of the present disclosure, the inlet communication element includes a valve assembly 30.

Referring to FIG. 5, the valve assembly 30 includes a valve housing 130, a core 230, a spring 330, and a plate member 430. The valve housing 130 is fixed to the accommodation part 210. According to an embodiment of the present disclosure, the valve housing 130 is screw-coupled to the accommodation part 210. According to an embodiment of the present disclosure, the valve housing 130 may be seated on and fixed to the inlet 211 of the accommodation part 210.

The core 230 is accommodated inside the valve housing 130. The core 230 is accommodated inside the valve housing 130 to be linearly movable in a length direction of the accommodation part 210. The core 230 includes a hollow 231. The hollow 231 is formed in a length direction of the core 230, and the cooling water flows through the hollow 231. An opening 233 is formed in a lateral direction of the core 230. The cooling water may flow in the core 230 or to the hollow 231 through the opening 233.

A spring 330 is mounted between the valve housing 130 and the core 230, and the spring 330 is supported on the valve housing 130. When the core 230 is moved toward the spring 330, the spring 330 is compressed between the valve housing 130 and a flange 235 formed on one end of the core 230. When the core 230 returns to its original position, the spring 330 between the flange 235 and the valve housing 130 returns to its original position.

A plate member 430 is coupled to the core 230. According to an embodiment of the present disclosure, a coupler 237 insertable into the plate member 430 may be provided in the core 230, and a hole 431 into which the coupler 237 is insertable may be formed in the plate member 430. The plate member 430 may block a flow path formed in the inlet 211 or in the accommodation part 210. The plate member 430 is coupled to the core 230 to be located on an outer side of the valve housing 130. The plate member 430 may be provided with a packing member 530 for watertightness on a surface in contact with the valve housing 130. When the flow of the cooling water is blocked, the plate member 430 is pressed against the valve housing 210 to prevent a back flow.

A retainer ring 630 is mounted on the coupler 237 of the core 230 passing through the hole 431. The retainer ring 630 fixes the core 230 and the plate member 430 against each other. As a non-limiting example, the retainer ring 630 may be an E-ring.

The ball joint 40 and the socket joint 42 are operatively associated with the valve assembly 30. As shown in FIG. 6, the ball joint 40 is integrally formed with the filtering element 20. The socket joint 42 is coupled to the ball joint 40 and the lid 110.

The socket joint 42 protrudes outward from the lid 110. To this end, according to an embodiment of the present disclosure, a through-hole 115 is provided in the lid 110. A portion of the socket joint 42 is configured to protrude outward from the lid 110 through the through-hole 115.

According to an embodiment of the present disclosure, the socket joint 42 is integrally formed with the filtering element 20. That is, the ball joint 40, the socket joint 42, and the filtering element 20 may be integrally formed. According to another embodiment of the present disclosure, the socket joint 42 may be provided separately from the filtering element 20 and coupled to the filtering element 20. However, in the former case in which the socket joint 42 and the filtering element 20 are integrally formed, the filtering element 20 may be configured in a cylindrical shape.

The socket joint 42 is rotatably coupled to the lid 110 with respect thereto. According to an embodiment of the present disclosure, the socket joint 42 is screw-coupled to the lid 110. A male thread is formed on an outer surface of the socket joint 42, and a female thread is formed on an inner surface of the lid 110. When the socket joint 42 is rotated and moved, the filtering element 20 connected by the ball joint 40 is configured to move together with the socket joint 42. The ball joint 40 is not rotated relative to the socket joint 42 and is fixed to the socket joint 42. That is, the ball joint 40 is configured to move linearly without rotation.

More specifically, as described above, a case in which the socket joint 42 and the filtering element 20 are configured separately will be described first. When the socket joint 42 is rotated, the filtering element 20 connected to the socket joint 42 by the ball joint 40 is not rotated and moves only vertically or linearly within the filter housing 10. In this case, there is no limitation on the shape of the filter housing 10.

In contrast, a case in which the socket joint 42 and the filtering element 20 are integrally formed will be described. When the socket joint 42 is rotated, since the filtering element 20 integrally formed with the socket joint 42 is also rotated together, as described above, the filtering element 20 may be configured in a structure which is easily rotated, such as a cylinder.

A watertight member may be provided between the lid 110 and the socket joint 42. In one embodiment, a recess 44 may be formed in the socket joint 42. For example, the recess 44 forms a space between the recess 44 and an inner wall of the lid 110. Accordingly, the recess 44 may prevent the cooling water in the accommodation part 210 from leaking through the through-hole 115. The watertight member is not limited only to the recess 44, and a known watertight member such as a packing member may be applied.

Figure 7:
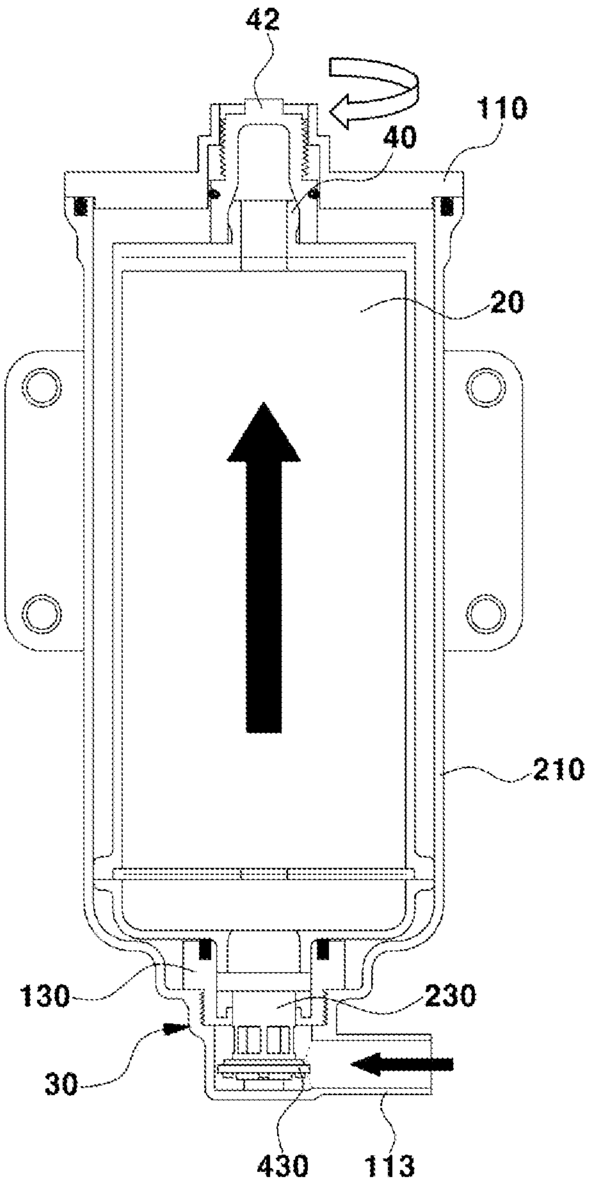
FIGS. 7 and 8 are diagrams for describing communication and blocking of a fluid into a housing of an embodiment of FIG. 3.

As shown in FIG. 7, when a vehicle is traveling, the inlet 211 of the filter housing 10 is opened so that cooling water may pass through the filter housing 10. When the socket joint 42 is rotated, for example, in a clockwise direction, the socket joint 42 is engaged with a female thread formed in the through-hole 115 of the lid 110 to be rotated and moved downward. Due to the descending of the socket joint 42, the ball joint 40 coupled to the socket joint 42 is also moved downward, and thus the filtering element 20 is moved downward in the accommodation part 210. As the filtering element 20 is moved downward, the core 230 below the filtering element 20 is also moved downward. As the plate member 430 coupled to the core 230 is moved away from the valve housing 130, the cooling water is introduced into the hollow 231 of the core 230 through the opening 233. Through the above process, the cooling water may flow into the filter housing 10.

Figure 8:
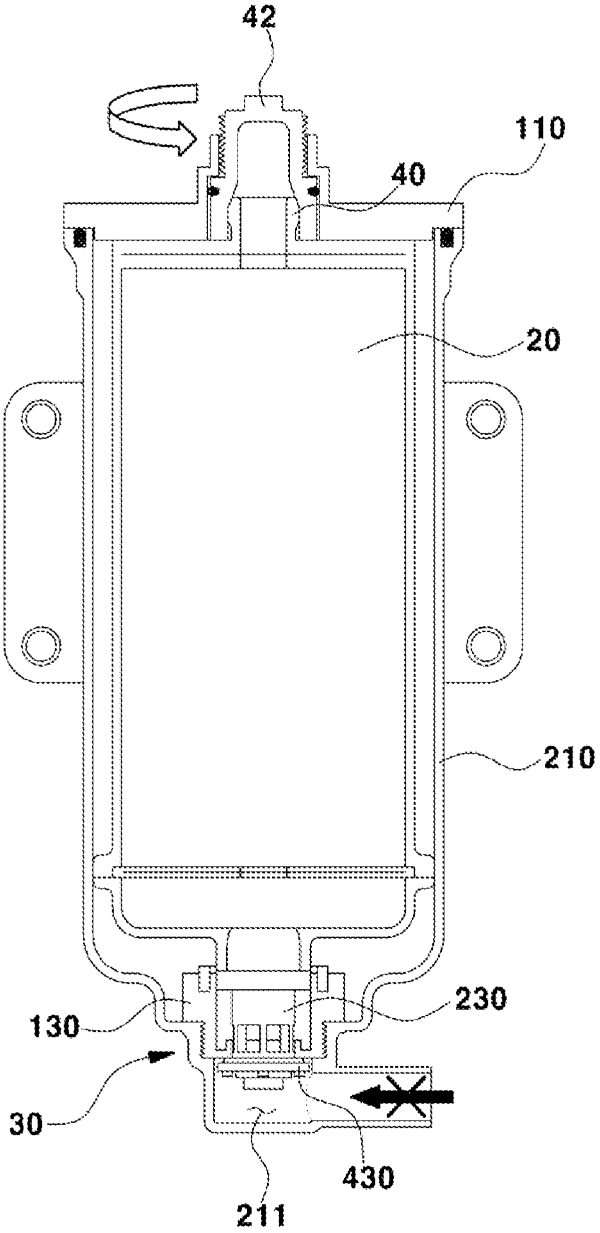

As shown in FIG. 8, when the filtering element 20 is replaced, the flow of the cooling water through the inlet 211 may be blocked. When the socket joint 42 is rotated in a reverse direction, that is, is rotated in a counterclockwise direction, the socket joint 42 is moved upward. Due to the above operation, the filtering element 20 and the core 230 below the filtering element 20 are also moved upward, and the plate member 430 is pressed against a lower end of the valve housing 130. As described above, the valve assembly 30 may block the flow of the cooling water. When the lid 110 is detached for replacement of the filtering element 20, the filtering element 20 coupled to the lid 110 is also detached. When the filtering element 20 is replaced in the detached lid 110 and the detached filtering element 20 and assembled with the accommodation part 210 again, the replacement of the filtering element 20 is completed.

The outlet communication element is operatively connected to the inlet communication element. According to some embodiments of the present disclosure, the outlet communication element includes a control valve for controlling a flow path of the cooling water, which is basically mounted to the cooling water circulation system. When the flow path on a side where the cooling water is discharged from the ion filter 1 is blocked through the control valve, it is possible to prevent the cooling water from leaking to the outlet of the ion filter 1.

Figure 9:
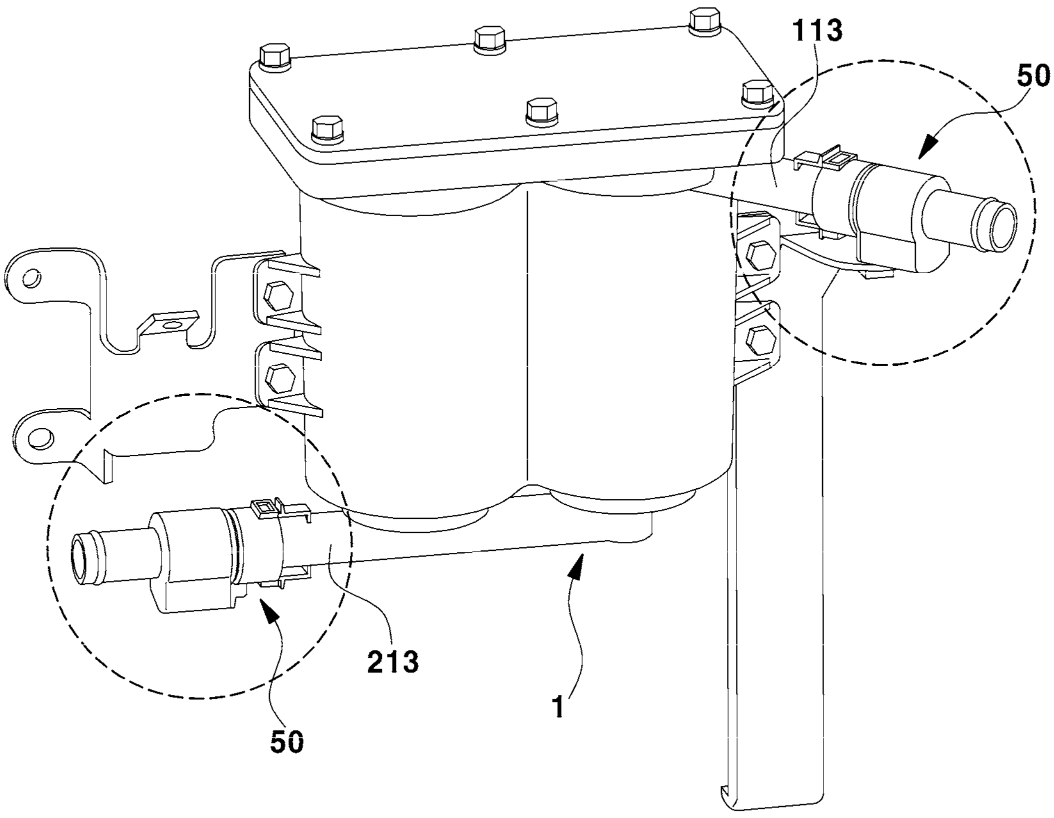
FIG. 9 is a diagram illustrating an ion filter according to some embodiments of the present disclosure.
Figure 10:
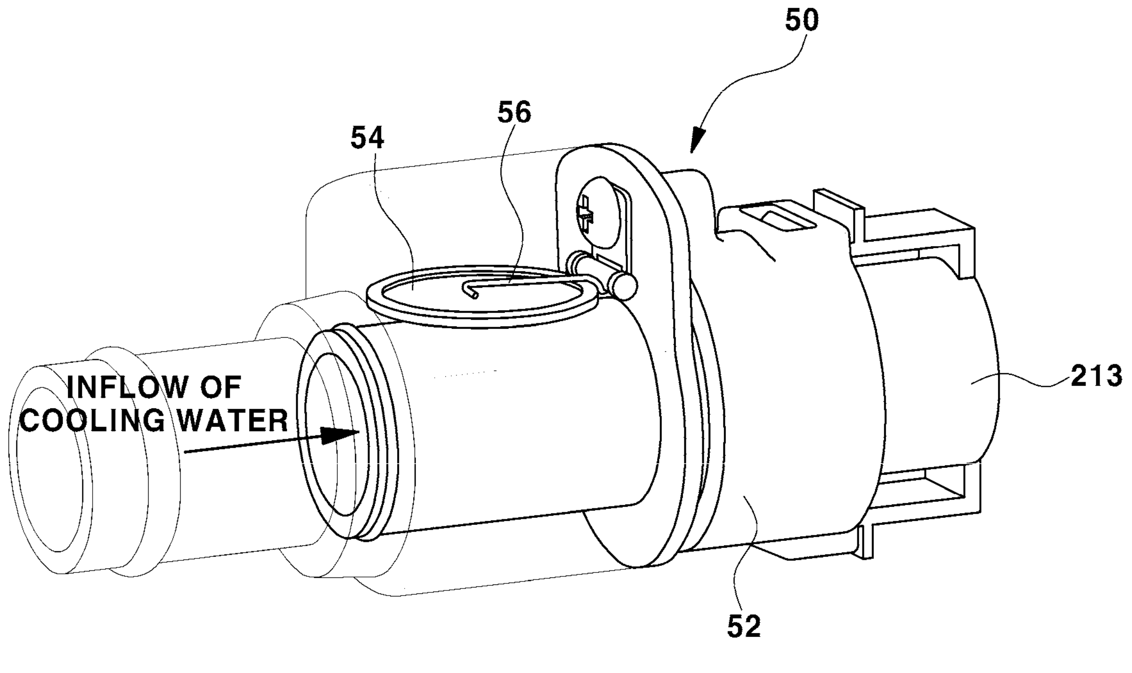
FIGS. 10 and 11 are enlarged views illustrating dotted line portions of FIG. 9.
Figure 11:
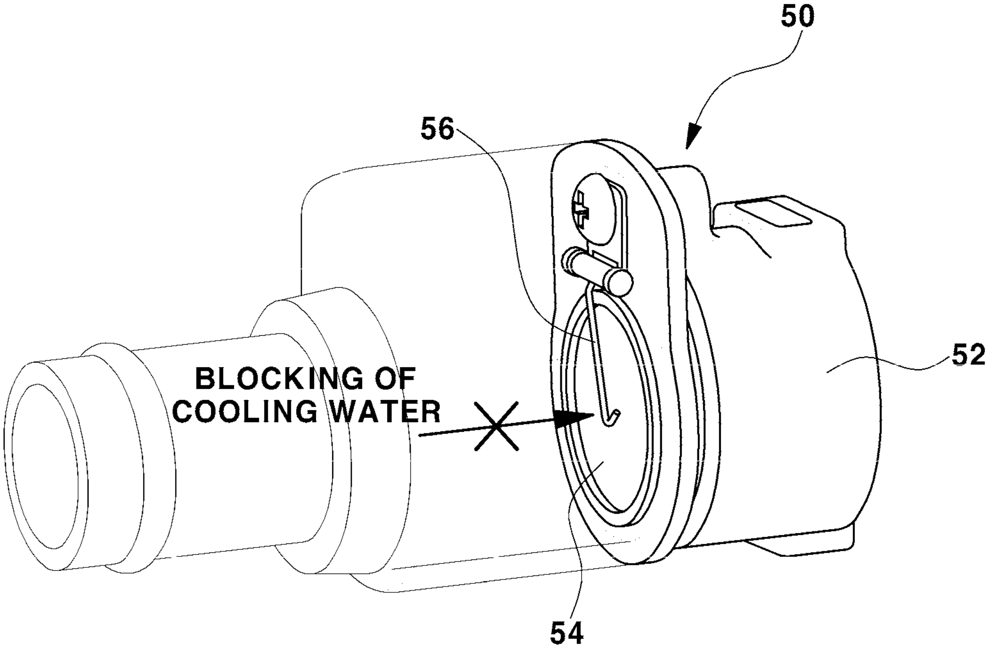

As shown in FIGS. 9 to 11, according to some embodiments of the present disclosure, the inlet communication element and the outlet communication element may each include an adjustment member 50. In particular, the adjustment member 50 may be mounted on the tubular part 113 of the outlet 111 and the tubular part 213 of the inlet 211. According to an embodiment of the present disclosure, the adjustment member 50 includes a valve body 52 and a valve plate 54.

The valve body 52 is disposed to surround circumferences of the tubular parts 113, 213. The tubular parts 113, 213 may pass through the valve body 52. In addition, the valve body 52 is detachably mounted on each of the tubular parts 113 and 213 therefrom.

The valve plate 54 is pivotably coupled to the valve body 52 with respect thereto. When the tubular parts 113, 213 pass through the valve body 52, the valve plate 54 is pivoted with respect to the valve body 52 so that the tubular parts 113, 213 pass through the valve plate 54. As a non-limiting example, the valve plate 54 may be configured to be pivoted at an angle of approximately 90° with respect to the valve body 52. When there is no external force or pushing force due to the tubular parts 113, 213, the valve plate 54 is pressed against the valve body 52. Therefore, the valve plate 54 blocks a flow of a fluid or the cooling water to the valve body 52. When an external force or a pushing force due to the tubular parts 113, 213 is applied, the valve plate 54 is pivoted with respect to the valve body 52. To this end, according to an embodiment of the present disclosure, the valve plate 54 is connected to the valve body 52 through a return spring 56 or a torsion spring. One end of the return spring 56 is connected to the valve plate 54, and the other end thereof is connected to the valve body 52. Due to the external force or the pushing force of the tubular parts 113, 213, the return spring 56 is deformed. Until the external force is removed, the return spring 56 stays deformed. When the external force is removed, the return spring 56 returns to its original state, the valve plate 54 is pressed against the valve body 52 again. Therefore, when the ion filter 1 is detached from the cooling water circulation line, the cooling water does not flow out of the ion filter 1.

The adjustment member 50 may be disposed in both the tubular part 213 of the inlet 211 of the ion filter 1 and the tubular part 113 of the outlet 111 of the ion filter 1. Consequently, the ion filter 1 may be modularized from the fuel cell system. When the ion filter 1 is detached from the cooling water circulation line for maintenance, it is possible to prevent the cooling water from leaking from the ion filter 1.

Figure 12:
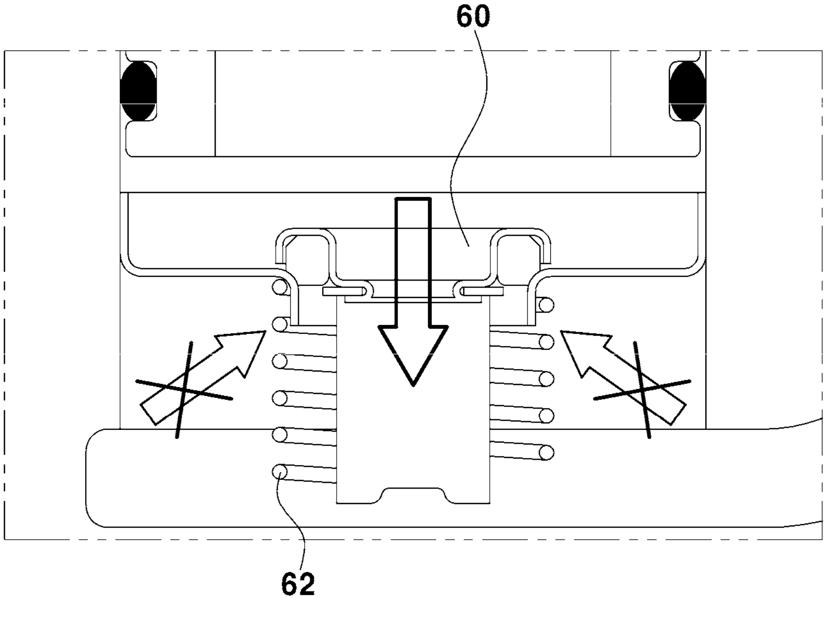
FIGS. 12 and 13 are diagrams illustrating an ion filter according to some embodiments of the present disclosure.
Figure 13:
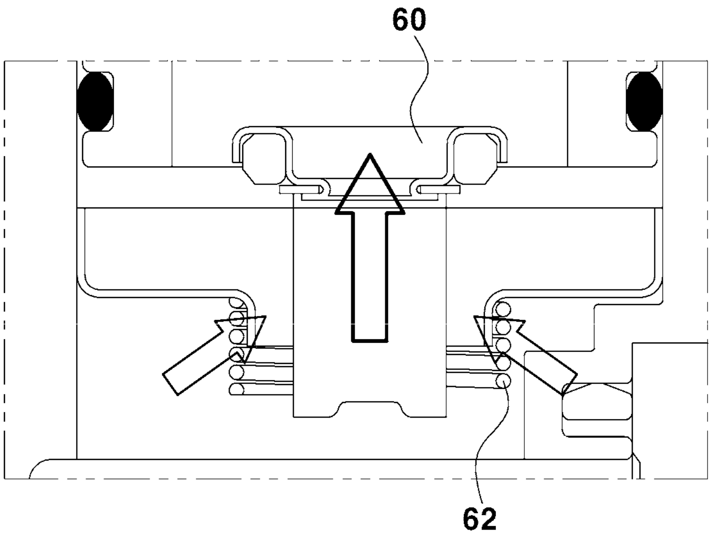

Referring to FIGS. 12 and 13, according to some embodiments of the present disclosure, the inlet communication element and the outlet communication element may each be a valve 60 which is automatically opened or closed due to an inflow pressure of the cooling water. When the cooling water flows, the valve 60 is opened due to a pressure of the flowing cooling water. On the other hand, when the cooling water does not flow such as when the filter is replaced, the valve 60 is closed because there is no pressure of the cooling water.

The valve 60 is seated on the accommodation part 210 to block the inlet 211. When the cooling water is introduced into the inlet portion, the valve 60 is separated from the inlet 211 due to the inflow pressure of the cooling water. According to an embodiment of the present disclosure, a valve spring 62 capable of achieving the opening of the valve 60 is mounted on a circumference of the valve 60. One end of the valve spring 62 is supported on the inlet portion to achieve a movement of the valve 60. To this end, the valve spring 62 may be configured to have a suitable spring constant according to the inflow pressure of the cooling water. Likewise, the valve 60 may also be disposed on the outlet 111.

According to the present disclosure, provided is the ion filter having no limitation on a mounting position by overcoming water head limitation of the ion filter.

In addition, according to the present disclosure, it is possible to reduce costs of components, such as a pipe connected to the ion filter.

The ion filter according to the present disclosure may be modularized, and thus assemblability may be improved.

Although the present disclosure has exemplarily described the ion filter mounted on the fuel cell system of the vehicle, the ion filter may be applied to other systems with water head limitations.

An ion filter according to the present disclosure can improve the degree of freedom in design by overcoming water head limitation of the conventional ion filter.

According to the present disclosure, there is provided an ion filter in which a filter can be easily replaced.

It should be understood that the embodiments of the present disclosure are not limited to the above described embodiments and the accompanying drawings, and various substitutions, modifications, and alterations can be devised by those skilled in the art without departing from the technical spirit of the present disclosure.

The invention claimed is:

1. An ion filter, comprising:

a filter housing positioned on a flow path along which a fluid flows;

a filtering element positioned in the filter housing, and configured to filter the fluid introduced into the filter housing, wherein the filtering element is configured to remove ions from the fluid, wherein the fluid is cooling water; and an inlet communication element provided on an inlet portion of the filter housing, the inlet communication element including a core being movable together with the filtering element to allow or block a flow of fluid introduced into the filter housing from the flow path;

wherein the filtering element includes a socket joint coupled to the filtering element via a ball joint integrally formed with the filtering element, the socket joint protruding outside of the filter housing and rotatably coupled to the filter housing, and wherein the ball joint is fixedly coupled to the socket joint such that the filtering element linearly moves as the socket joint is rotated.

2. The ion filter of claim 1, wherein:

the filtering element is configured to be vertically movable in the filter housing;

the inlet communication element further includes:

a valve housing fixed inside the filter housing; and the core being positioned in the valve housing, and configured to be linearly movable together with the filtering element; and wherein the core is configured to introduce the fluid into the filter housing when moved in a first direction, and to block the flow of the fluid into the filter housing when moved in a second direction opposite to the first direction.

3. The ion filter of claim 2, wherein:

the core includes a plurality of openings configured to communicate between an outside and an inside of the core; and the inlet communication element further includes a plate member connected to the core;

wherein the plate member is sealingly pressed against the valve housing when moved in the second direction.

4. The ion filter of claim 3, wherein the inlet communication element further includes an elastic member positioned on a circumference of the core and supported on the valve housing.

5. The ion filter of claim 3, wherein the filter housing includes:

an accommodation part in which the filtering element is positioned; and a lid coupled to the accommodation part.

6. The ion filter of claim 5, wherein the socket joint is screw-coupled to the lid.

7. The ion filter of claim 5, wherein a watertight member is provided between the lid and the socket joint.

8. The ion filter of claim 1, wherein the filtering element is formed in a cylindrical shape.

9. The ion filter of claim 1, further comprising:

an outlet communication element provided on an outlet portion of the filter housing, and configured to block the flow of the fluid discharged to the outside of the filter housing when the filter housing is detached from the flow path.

10. The ion filter of claim 9, wherein:

the outlet communication element includes an adjustment member, wherein the adjustment member is mounted on a tubular part of the outlet portion to allow the flow of the fluid in the tubular part and is detached from the tubular part to block the flow of the fluid in the tubular part.

11. The ion filter of claim 10, wherein the adjustment member includes:

a valve body through which the tubular part passes, and which is detachably mounted on the tubular part; and a valve plate pivotably coupled to the valve body and pivoted by the tubular part.

12. The ion filter of claim 11, further comprising:

a return spring configured to couple the valve plate to the valve body.

13. The ion filter of claim 9, wherein the outlet communication element includes a control valve for controlling a flow path of cooling water, wherein the control valve is positioned on the flow path and configured to control the flow of the cooling water.

14. The ion filter of claim 1, wherein the inlet communication element further includes an adjustment member which is mounted on a tubular part formed on the inlet portion of the filter housing to allow a flow of a fluid in the tubular part, and which is detached from the tubular part to block the flow of the fluid in the tubular part.

15. The ion filter of claim 1, wherein the inlet communication element includes a valve configured to open the inlet portion due to a pressure of the fluid formed due to the flow of the fluid, close the inlet portion when the pressure of the fluid is removed, and provided on the flow path of the inlet portion.

* * * * *